(12) United States Patent
Chang et al.

(10) Patent No.: US 9,009,825 B1
(45) Date of Patent: Apr. 14, 2015

(54) ANOMALY DETECTOR FOR COMPUTER NETWORKS

(71) Applicant: Trend Micro Incorporated, Tokyo (JP)

(72) Inventors: Hung-Jen Chang, Fremont, CA (US);
Jian-Ying Chen, Taipei (TW);
Yuanhung Lin, San Jose, CA (US);
Liwei Ren, San Jose, CA (US)

(73) Assignee: Trend Micro Incorporated, Tokyo (JP)

( * ) Notice: Subject to any disclaimer, the term of this patent is extended or adjusted under 35 U.S.C. 154(b) by 89 days.

(21) Appl. No.: 13/924,196

(22) Filed: Jun. 21, 2013

(51) Int. Cl.
*G06F 11/00* (2006.01)
*H04L 29/06* (2006.01)

(52) U.S. Cl.
CPC .................................. *H04L 63/1425* (2013.01)

(58) Field of Classification Search
USPC .............................. 726/22–25; 713/187–188; 709/224–225, 229
See application file for complete search history.

(56) References Cited

U.S. PATENT DOCUMENTS

| | | | | |
|---|---|---|---|---|
| 5,826,013 | A * | 10/1998 | Nachenberg | 726/22 |
| 7,096,498 | B2 * | 8/2006 | Judge | 726/22 |
| 7,540,025 | B2 * | 5/2009 | Tzadikario | 726/22 |
| 8,561,193 | B1 * | 10/2013 | Srivastava et al. | 726/24 |

OTHER PUBLICATIONS

Indraneel Mukhopadhyay, et al. "A Comparative Study of Related Technologies of Intrusion Detection & Prevention Systems", Jan. 2011, pp. 28-38, Journal of Information Security.
S. Grace Chang, et al. "Adaptive Wavelet Thresholding for Image Denoising and Compression", Sep. 2000, pp. 1532-1546, vol. 9, No. 9, IEEE Transactions on Image Processing.
Karen Scarfone, et al. "Guide to Intrusion Detection and Prevention Systems (IDPS)", Feb. 2007, pp. 1-127, Special Publication 800-94, National Institute of Standards and Technology.
V. Barnett, et al., Outliers in Statistical Data, 3rd ed., 1993, pp. 216-221, John Wiley & Sons, Chichester, England.

* cited by examiner

*Primary Examiner* — Hosuk Song
(74) *Attorney, Agent, or Firm* — Okamoto & Benedicto LLP

(57) ABSTRACT

A computer system includes a data collector and an anomaly detector. The data collector monitors network traffic/event log and sends monitoring data to the anomaly detector. The anomaly detector extracts values for a category of measure from the monitoring data and processes the values to generate a processed value. The anomaly detector predicts an expectation value of the category of measure based at least on time decayed residual processed values. The anomaly detector determines a deviation of the processed value from the expectation value to detect an anomaly event, and applies a security rule to the anomaly event to detect a security event.

20 Claims, 5 Drawing Sheets

ANOMALY DETECTOR FOR COMPUTER NETWORKS

BACKGROUND OF THE INVENTION

1. Field of the Invention

The present invention relates generally to computer security, and more particularly but not exclusively to methods and apparatus for detecting anomaly events at near real time in computer networks.

2. Description of the Background Art

Events in a computer network may be stored and analyzed to detect security events, such as leakage of sensitive data and unauthorized access to the computer network. Unfortunately, analyzing logged events takes time and is relatively complex because of the large volume of data associated with the events. As a result, most security events cannot be identified until a long time after the security event has taken place.

SUMMARY

In one embodiment, a computer system includes a data collector and an anomaly detector. The data collector monitors network traffic and/or event logs and sends monitoring data to the anomaly detector. The anomaly detector extracts values for a category of measure from the monitoring data and processes the values to generate a processed value. The anomaly detector predicts an expectation value of the category of measure based at least on time decayed residual processed values. The anomaly detector determines a deviation of the processed value from the expectation value to detect an anomaly event, and applies a security rule to the anomaly event to detect a security event.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
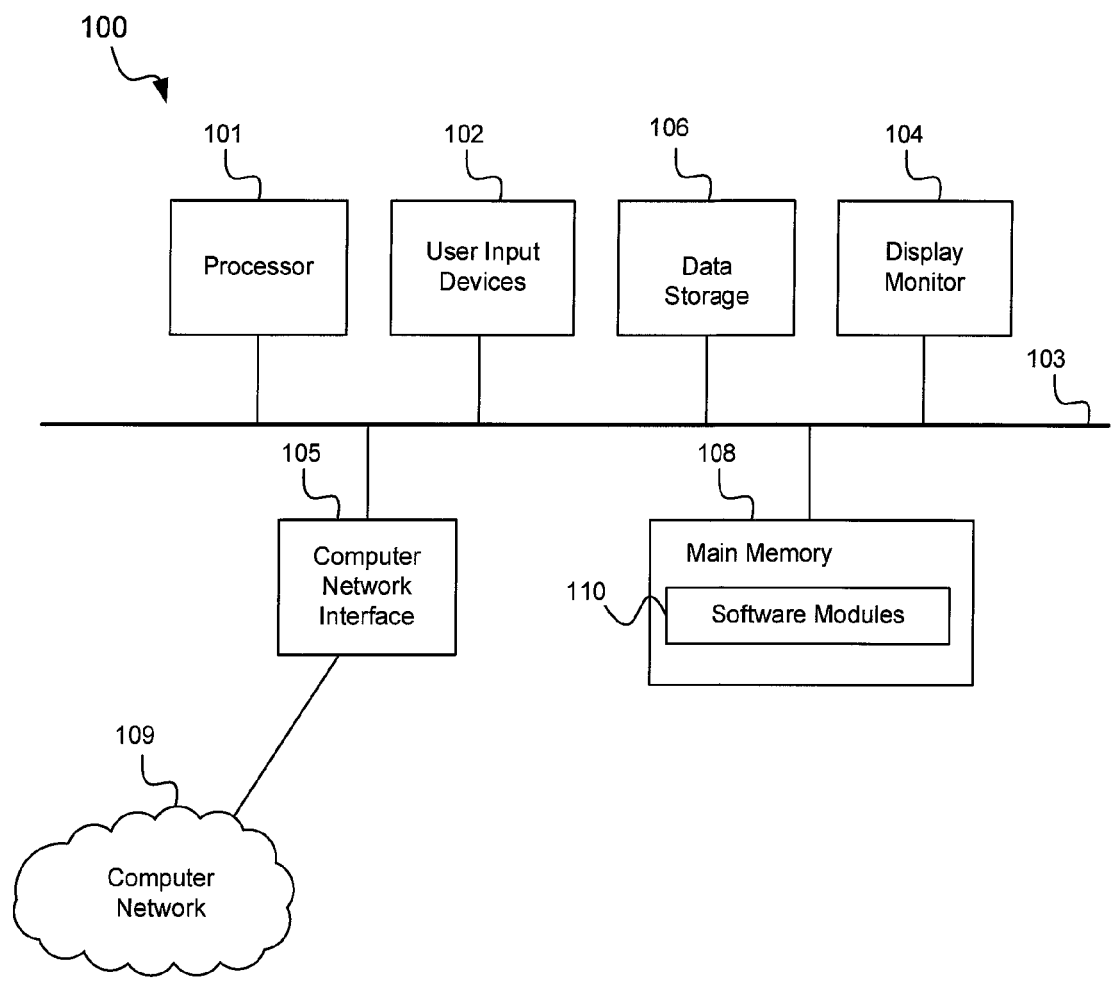
FIG. 1 shows a schematic diagram of a computer that may be employed with embodiments of the present invention.

Referring now to FIG. 1, there is shown a schematic diagram of a computer 100 that may be employed with embodiments of the present invention. The computer 100 may be employed as an anomaly detector and other computers described below. The computer 100 may have fewer or more components to meet the needs of a particular application. The computer 100 includes one or more processors 101. The computer 100 may have one or more buses 103 coupling its various components. The computer 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor, cathode ray tube), a computer network interface 105 (e.g., network adapter, modem), and a main memory 108 (e.g., random access memory). The computer network interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. As an example, the software modules 110 may comprise a category configurator, a data preparer, a data miner, and an event analyzer when the computer 100 is employed as part of an anomaly detector. As another example, the software modules 110 may comprise an agent when the computer 100 is employed as a monitored computer.

Figure 2:
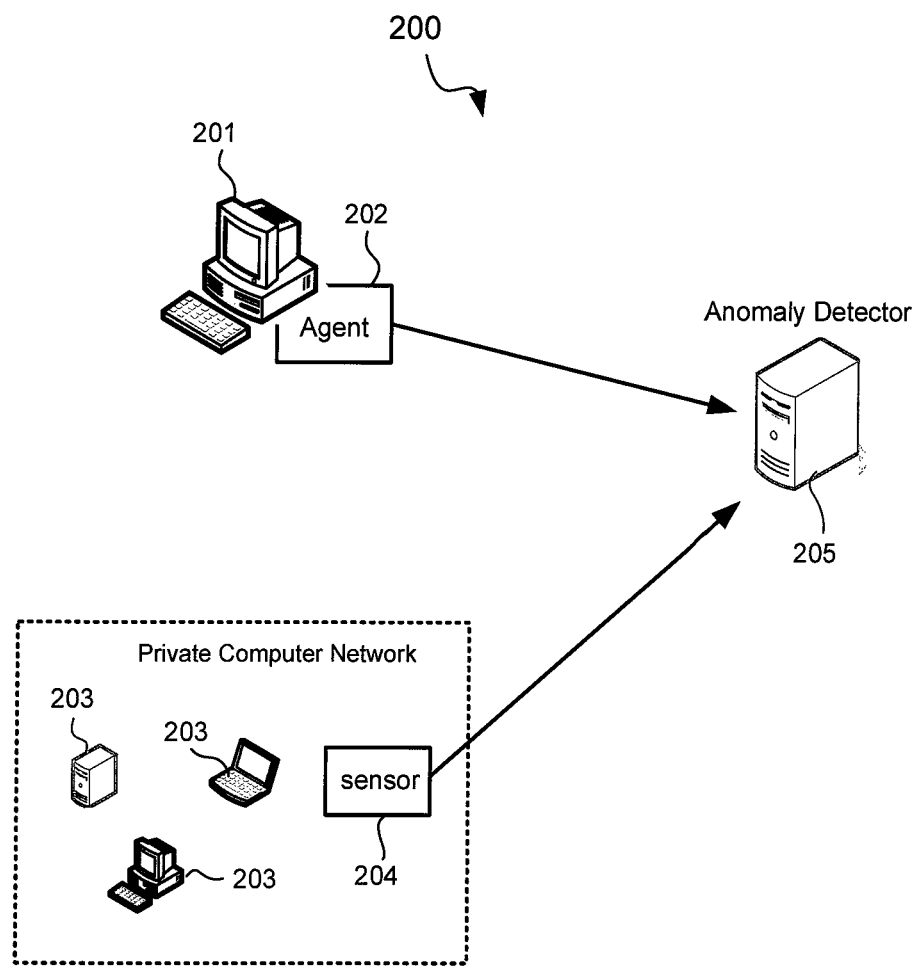
FIG. 2 shows a schematic diagram of a computer system in accordance with an embodiment of the present invention.

FIG. 2 shows a schematic diagram of a computer system 200 in accordance with an embodiment of the present invention. The computer system 200 may comprise private and/or public computer networks, such as the Internet. The computer system 200 may include an anomaly detector 205 and one or more monitored computers 201 and 203. In the example of FIG. 2, the monitored computers 201 and 203 are monitored by the anomaly detector 205 for security events, such as data leakage and other security threats. One or more agents 202 and sensors 204 serve as data collectors for receiving network traffic and/or event log from the monitored computers 201 and 203. In the example of FIG. 2, a monitored computer 201 serve as a host that runs an agent 202, which monitors network traffic/event log from the monitored computer 201. Similarly, a sensor 204 monitors network traffic/event log in a private computer network that includes the monitored computers 203. The sensor 204 may comprise an appliance, a gateway, or other computer for monitoring network traffic/event log. The sensor 204 and agent 202 may stream live monitoring data to the anomaly detector 205 for analysis. In one embodiment, the sensor 204 and agent 202 are configured to extract particular data from network traffic/event log, including social security numbers, credit card numbers, and other data that will be measured by the anomaly detector 205 for particular entities, such as source Internet Protocol (IP) addresses, source IP addresses, and communication protocol. As a particular example, the sensor 204 and agent 202 may retrieve credit card numbers from network traffics/event logs having a particular source IP address, destination IP address, and transmitted by hypertext transfer protocol (HTTP). This allows the anomaly detector 205 to measure the number of credit card numbers being transmitted from the source IP address to the destination IP address by HTTP. The sensor 204 and agent 202 may employ any suitable network traffic/event log monitoring technique, such as those employed in data loss prevention (DLP), packet sniffing, protocol analysis, and pattern matching, without detracting from the merits of the present invention.

The anomaly detector 205 may comprise one or more computers that receive monitored network traffic data/event logs from one or more data collectors (e.g., agent 202, sensor 204), prepare the network traffic data/event logs to generate processed values for predefined categories of measures, detect an anomaly event from the processed values based on an iteratively adjusted baseline with a time decay factor, and apply one or more security rules to the anomaly event to detect a security event. The anomaly detector 205 provides a hybrid approach in that the detection of anomaly events may be performed using a numerical/computational solution, and the detection of the security event may be performed by applying rules that are predefined by an administrator or user to the anomaly events. The anomaly detector 205 also provides a near real-time solution in that it may perform its function in almost real-time speed.

In one embodiment, the anomaly detector 205 is configured to detect a security event by analyzing one or more categories of measures. A category of measure may comprise a particular data or particular set of data to be measured for detecting security events. For example, a category of measure may be a count of network traffic volume (in bytes). Another category of measure may be a count of social security numbers and/or credit card numbers in business transactions. Yet another category of measure may be a count of number of passwords in a login process. A category of measure may be data that need to be protected or controlled to comply with regulations, such as the Payment Card Industry Data Security Standard (PCI DSS), Health Insurance Portability and Accountability Act (HIPAA), and Sarbanes-Oxley Act (SOX), for example.

The anomaly detector 205 may measure a value for a category of measure for any combination of entities, such as source IP address, destination IP address, user ID, and communication protocol. Each value of a category of measure may contain both the base measures received from collectors and/or some derived measures from these base measures. A value of a category of measure can be a weighted sum of its individual measure values.

Figure 3:
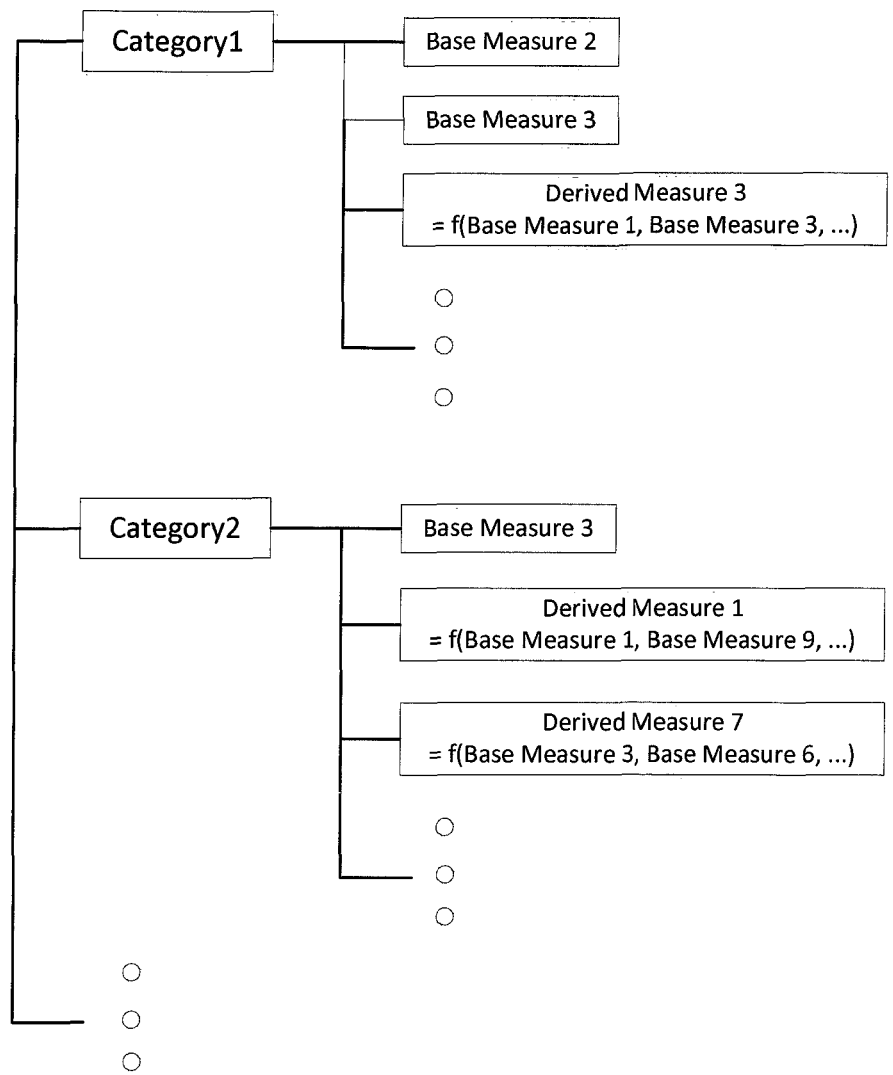
FIG. 3 schematically illustrates categories of measures in accordance with an embodiment of the present invention.

FIG. 3 schematically illustrates categories of measures in accordance with an embodiment of the present invention. In the example of FIG. 3, "Category1" may comprise a set of categories of measures for a particular compliance policy, "Category2" may comprise a set of categories of measures for another compliance policy, etc. A category of measure may be a base measure or a derived measure. In the example of FIG. 3, "Base Measure 2", "Base Measure 3", "Base Measure 6", and "Base Measure 9" are base measures, and "Derived Measure 1", "Derived Measure 3," and "Derived Measure 7" are derived measures.

A base measure is a value of a category of measure as collected by and received from data collectors. A derived measure is a function of two or more base measures. For example, a Category1 may be a set of categories of measures for complying with PCI DSS and includes the Base Measure 2 for the number of credit card numbers, the Base Measure 3 for the number of packets in the corresponding network traffic, and the Derived Measure 3 may be a value that is a function of a Base Measure 1, the Base Measure 3, etc. For example, the Base Measure 1 may be a number of bytes and the Derived Measure 3 may be the ratio of bytes to packet.

Figure 4:
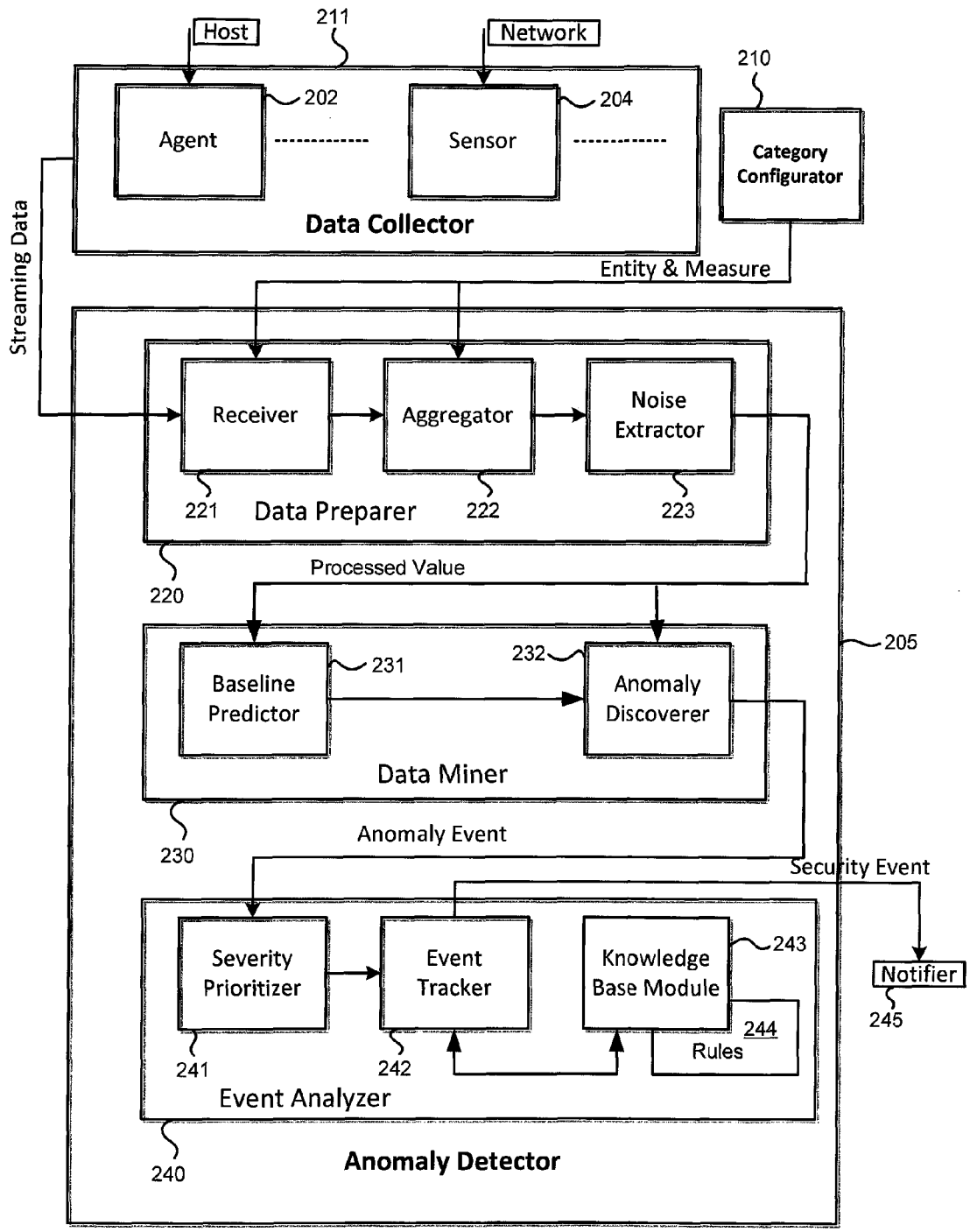
FIG. 4 shows a flow diagram of an example operation of an anomaly detector in accordance with an embodiment of the present invention.

FIG. 4 shows a flow diagram of an example operation of the anomaly detector 205 in accordance with an embodiment of the present invention. In the example of FIG. 4, the anomaly detector 205 comprises a category configurator 210, a data preparer 220, a data miner 230, and an event analyzer 240. The components of the anomaly detector 205 may be implemented as computer-readable program code, logic circuits, application specific integrated circuit, and other implementations. The anomaly detector 205 may be embodied in a special purpose computer (e.g., a security appliance), gateway, or a computer, either as a standalone or a network of computers.

In the example of FIG. 4, the anomaly detector 205 receives live streaming data from one or more data collectors 211. A data collector 211 may comprise a computer hosting an agent 202 or a sensor 204 of a computer network, for example. The data collector 211 may monitor network traffic/event log, retrieve monitoring data from the network traffic/event log, and stream the monitoring data to the anomaly detector 205 over the Internet or some other computer network. The data collector 211 may parse network traffic/event log to retrieve source IP addresses, destination IP addresses, user IDs, the communication protocol, payload data, passwords, social security numbers, credit card numbers, etc. and other data for a category of measure and entities.

The category configurator 210 includes a user interface to allow a user or administrator to select categories of measures to be measured, and informs the data preparer 211 how to calculate the values of the categories of measures. In one embodiment, the category configurator 210 allows for selection of a set of entities with information available from data collectors 211, selection of a set of base measures with data available from data collectors 211, definition of a set of derived measures (which is a function of selected base measures), and configuration of a set of categories of measures (e.g., as in FIG. 3).

The data preparer 220 receives live streaming data from the data collectors 211 and analyzes the streaming data to determine values for categories of measures. In the example of FIG. 4, the data preparer 220 may comprise a receiver 221, an aggregator 222, and a noise extractor 223. The receiver 221 receives the streaming data from the data collector 211, and parses the streaming data to retrieve entities and categories of measures indicated by the category configurator 210. The receiver 221 may arrange the retrieved data into "entity set-base measure" pairs, and pass the pairs to the time-based aggregator 222. In one embodiment, the entity set may comprise any combination of entities, such as source IP address, destination IP address, user ID, and the communication protocol. As a particular example, the receiver 221 may retrieve from the streaming data the number of credit card numbers (base measure) transferred from a source IP address to a destination IP address by HTTP (entity set). The receiver 221 then forwards the just mentioned base measure and entity set to the aggregator 222.

The aggregator 222 aggregates each distinct entity set and base measure for a time granularity period. In the above example, assuming the time granularity period is 30 minutes, the aggregator 222 determines the number of credit card numbers transferred from the source IP address to the destination IP address by HTTP within a 30 minute period. Researchers usually define multiple time granularities in order to study short-term and long-term data behaviors at the same time. The data aggregator 222 may prepare the aggregated values of categories of measures defined by the category configurator 210 at the end of the time granularity period. The value of a category of measure can be a weighted sum of its individual measure values. The data aggregator 222 may sequentially output the aggregated values to the noise extractor 223.

In one embodiment, the noise extractor 223 periodically analyzes and updates hourly and daily frequency amplitudes from each week-range. For each sequential input data from the aggregator 222, the frequency amplitudes allow for calculation of the base components and thus the noise part in time domain, e.g., see M. Vetterli, G. Chang and B. Yu, "Adaptive Wavelet Thresholding for Image Denoising and Compression," *IEEE Transactions on Image Processing*, 9(9), pp. 1532-1546, 2000. This data manipulation step provides a solution to the issue of measure value variations by weekdays, day hours, etc. In other words, the noise extractor 223 removes the "regular difference" to form the residual from the value of every category of measure category accordingly. The output of the noise extractor 223, or of the aggregator 222 if a noise extractor 223 is not employed, may be sequentially output to the data miner 230 as processed values for corresponding entities.

Processed values of categories of measures are received by the data miner 230 from the data preparer 220. In one embodiment, the data miner 230 updates a baseline using a receive processed value, and calculates the deviation of the received processed value from the baseline to determine if the received processed value constitutes an anomaly event. In the example of FIG. 4, the data miner 230 comprises a baseline predictor 231 and an anomaly discoverer 232.

In one embodiment, the baseline predictor 231 receives a processed value for a category of measure from the data preparer 220, applies a time decay factor to residual processed values, and updates a baseline using an iterative process using the time decayed residual processed values and just received processed value. The time decay factor automates the aging out process by decreasing the effect of processed values as the processed values get older. In one embodiment, the time decay factor is exponential. For example, assuming the effect of a processed value $X_n$ to a baseline is $W_n X_n$, the weight $W_n$ may be defined to be $e^{-kt}$ (with k being a constant) such that as the time t progresses the effect or contribution of the processed value $X_n$ to the baseline decreases. As a particular example, a first baseline $BL_1$ may be defined as $$A_1 = 1$$

$$BL_1 = X_1 \quad \text{EQ. 1}$$

for a first processed value $X_1$. In general, for n>1, baseline $BL_n$ after receiving the next processed value $X_n$ may be iteratively computed as $$A_n = e^{-k} A_{n-1} + 1$$

$$BL_n = ((A_n - 1)/A_n) BL_{n-1} + (1/A_n) X_n \quad \text{EQ. 2}$$

$X_1$ is received first, and $X_n$ is received after $X_{n-1}$, etc. As can be appreciated, the contribution of a processed value $X_n$ on the baseline decreases as time progresses, and $BL_n$ is only a function of $BL_{n-1}$ and $X_n$. This makes baseline prediction become an iterative calculation. This is in marked contrast to other baseline approach, such as a simple average, where the any input data always has the same contribution to the baseline. The time decay factor not only automates the aging out process, but also reduces the number of historical input data (processed values in this example) that are needed for baseline calculation to one. It simplifies the storage and computation requirements. As can be appreciated, any suitable baseline algorithm with time decay factor applied to an input value may be used without detracting from the merits of the present invention. Similarly, standard deviation $SD_n$ can be calculated and is only a function of $BL_{n-1}$, $SD_{n-1}$ and $X_n$ to allow the iterative data processing algorithm.

In one embodiment, the baseline predictor 231 updates a previous baseline with the current (i.e., just received) processed value to generate the current baseline. The anomaly discover 232 may use the current baseline generated by the baseline predictor 231 to determine if the current processed value is an outlier and hence an anomaly, e.g., see V. Barnett & T. Lewis, Outliers in Statistical Data, 3rd ed. Chichester, England: John Wiley & Sons, 1993. In one embodiment, the anomaly discoverer 232 calculates the standard deviation of the current processed value from the current and previous baselines to determine if the current processed value is an anomaly. As a particular example, the anomaly discoverer 232 may employ the so-called "quality control series" to determine how much the current processed value deviates from the current baseline in terms of the latest predicted standard deviation. The higher the deviation of a processed value from a baseline, the more likely the processed value is an anomaly. The anomaly discover 232 may be configured to deem processed values that deviate a certain amount (e.g., greater than a deviation threshold) to be anomaly events, and to report the anomaly events including evidence of the anomaly (e.g., the processed value, entities, etc.) to the event analyzer 240.

In one embodiment, the event analyzer 240 receives reports of anomaly events from the data miner 230, prioritizes the anomaly events, and applies a security rule 244 to the anomaly event to determine if the anomaly event poses a security risk, i.e., a security event. In the example of FIG. 4, the event analyzer 240 comprises a severity prioritizer 241, an event tracker 242, and a knowledge base module 243.

The severity prioritizer 241 sets the severity levels of anomaly events based on, for example, the amount of deviation. For example, the severity prioritizer 241 may set severity levels for different ranges of deviations. The severity prioritizer 241 may automatically filter out non-critical anomaly events, such as anomaly events with low severity levels.

In one embodiment, the event tracker 242 applies a domain-knowledge related security rule 244 on a severe anomaly event to detect a security event. For example, for an anomaly event from the severity prioritizer 241, a security rule 244 may be "the anomaly from the same (entity set, category of measure) pair repeats for more than 5 times within the next 4 hours," etc. In that example, when the same anomaly from the same entity set and category of measure occurs for more than five times within the next four hours, the event tracker 242 will deem the anomaly to be a security event. Once an anomaly event meets the requirements of a security rule 244, the event tracker 242 may deem the anomaly event to be a security event and accordingly alert a notifier 245.

The knowledge base module 243 may store and maintain a knowledge base comprising a plurality of security rules 244. Each security rule 244 may be associated with a mathematical formula for calculating an alert level. For example, in the above example where the anomaly occurred more than five times within the following four hours, the corresponding security rule 244 may indicate an alert level of 10 when the anomaly occurred more than five times within the next four hours, an alert level of 6 when the anomaly occurred more than five times within the next three hours, and so on. The event tracker 242 may provide an alert level for a detected security event to the notifier 245, which notifies an administrator or user about the security event (e.g., by email, text message, message box, recording on security event log etc.).

Figure 5:
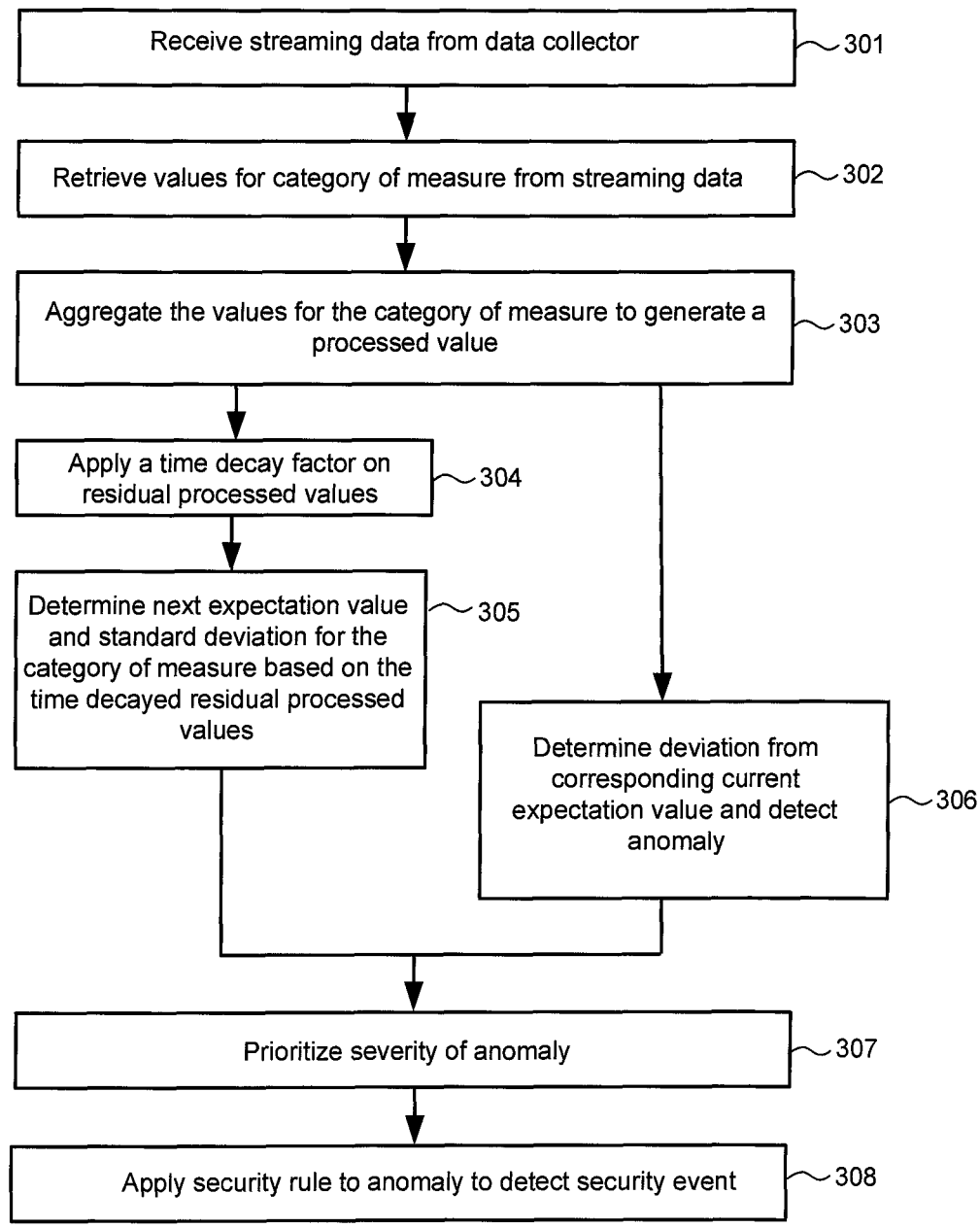
FIG. 5 shows a flow diagram of a method of detecting an anomaly event in accordance with an embodiment of the present invention.

FIG. 5 shows a flow diagram of a method of detecting an anomaly event in computer networks accordance with an embodiment of the present invention. The method of FIG. 5 is explained using the components of FIG. 4 for illustration purposes only. Other components may also be employed without detracting from the merits of the present invention.

In the example FIG. 5, a data preparer 220 receives live streaming data from a data collector 211 (step 301). The data preparer 220 retrieves values for a category of measure from the streaming data (step 302) and aggregates the values for a time granularity period to generate a processed value (step 303). A data miner 230 receives the processed value, and applies a time decay factor on residual processed values that were previously received from the data preparer 220 (step 304). In one embodiment, the time decay factor is exponential and decreases the effect or contribution of the residual values as a function of time in generating expectation values. The data miner 230 determines the next expectation value and standard deviation for the category of measure based at least on the decayed residual processed values (step 305). In one embodiment, the expectation value is a baseline that is generated based on the decayed residual processed values and the processed value. The data miner 230 determines how much the processed value of the category of measure deviates from the current expectation value of the category of measure and detects an anomaly event based on the deviation (step 306). An event analyzer 240 prioritizes the anomaly event based on its severity (step 307) and applies a security rule to the anomaly event to detect a security event (step 308).

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A system comprising:
    a data collector comprising a first computer, wherein the data collector monitors a computer network; and
    an anomaly detector comprising one or more computers, wherein the anomaly detector receives monitoring data from the data collector, extracts values for a category of measure from the monitoring data, processes the values for the category of measure to generate a processed value, applies a time decay factor to residual processed values previously received from the data collector to generate time decayed residual processed values, determines an expectation value of the category of measure based at least on the time decayed residual processed values, and determines a deviation of the processed value from the expectation value of the category of measure to detect an anomaly event.

2. The system of claim 1 wherein the category of measure is number of credit card numbers.

3. The system of claim 1 wherein the data collector comprises a sensor that monitors network traffic or event log in a private computer network.

4. The system of claim 1 wherein the first computer hosts an agent that monitors network traffic or event log of the first computer.

5. The system of claim 1 wherein the anomaly detector applies an exponential time decay factor to the residual processed values.

6. The system of claim 1 wherein the anomaly detector comprises an appliance.

7. The system of claim 1 wherein the anomaly detector aggregates the values for the category of measure for a time granularity period.

8. The system of claim 1 wherein the anomaly detector applies a security rule to the anomaly event to detect a security event.

9. The system of claim 8 the security event comprises data leakage.

10. A method comprising:
    a first computer sending monitoring data over a computer network; and
    a second computer receiving the monitoring data over the computer network, retrieving values for a category of measure from the monitoring data, processing the values for the category of measure to generate a processed value, applying a time decay factor to previously received residual processed values for the category of measure to generate time decayed residual processed values, determining an expectation value of the category of measure based at least on the time decayed residual processed values, determining a deviation of the processed value from the expectation value of the category of measure to detect an anomaly event, and applying a security rule to the anomaly event to detect a security event.

11. The method of claim 10 wherein the category of measure is number of credit card numbers.

12. The method of claim 10 wherein the second computer applies an exponential time decay factor to the residual processed values.

13. The method of claim 10 wherein the second computer aggregates the values for the category of measure for a time granularity period.

14. The method of claim 10 wherein the security event comprises data leakage.

15. The method of claim 10 wherein the first computer monitors network traffic or event log in a private computer network.

16. A system comprising:
    a first computer that collects values for a category of measure; and
    a second computer that processes the values for the category of measure to generate a processed value, applies a time decay factor on previously received residual processed values to generate time decayed residual processed values, determines an expectation value of the category of measure based at least on the time decayed residual processed values, determines a deviation of the processed value from the expectation value of the category of measure to detect an anomaly event, and applies a security rule to the anomaly event to detect a security event.

17. The system of claim 16 wherein the second computer applies an exponential time decay factor to the residual processed values.

18. The system of claim 16 wherein the second computer aggregates the values for the category of measure for a time granularity period.

19. The system of claim 16 the security event comprises data leakage.

20. The system of claim 16 wherein the first computer comprises a sensor that monitors network traffic or event log in a private computer network.

* * * * *